United States Patent [19]

Griesen

[11] Patent Number: 4,628,393

[45] Date of Patent: Dec. 9, 1986

[54] METHOD FOR SWITCHING IN A THREE-PHASE HIGH VOLTAGE CIRCUIT

[75] Inventor: Bertus Griesen, Hengelo, Netherlands

[73] Assignee: Hazemeijer B.V., Hengelo, Netherlands

[21] Appl. No.: 357,131

[22] Filed: Mar. 11, 1982

Related U.S. Application Data

[63] Continuation of Ser. No. 239,050, Feb. 27, 1981, abandoned.

[51] Int. Cl.$^4$ .......... H02H 3/033

[52] U.S. Cl. .......... 361/3; 361/5; 361/6; 361/7; 307/127

[58] Field of Search .......... 361/3, 5, 6, 7, 2; 307/125, 127, 130, 131, 134, 141, 141.4; 200/144 R, 145

[56] References Cited

U.S. PATENT DOCUMENTS

| | | | |
|---|---|---|---|
| 2,882,372 | 4/1959 | Preissler | 361/3 X |
| 3,402,324 | 9/1968 | Kesselring et al. | 361/5 |
| 3,555,354 | 1/1974 | Kotos | 361/5 |
| 3,753,044 | 8/1973 | Hawker et al. | 361/6 |

FOREIGN PATENT DOCUMENTS

| | | | |
|---|---|---|---|
| 963007 | 7/1964 | United Kingdom | 361/7 |
| 1473837 | 5/1977 | United Kingdom | 361/5 |

*Primary Examiner*—A. D. Pellinen
*Assistant Examiner*—Jeffrey A. Gaffin
*Attorney, Agent, or Firm*—Watson Cole Grindle & Watson

[57] ABSTRACT

A method for interrupting an inductive load in a three-phase, high voltage network by means of a switch having a quick dielectric recovery, in particular a vacuum switch, in which two of the three vacuum switches, having a quick dielectric recovery, open at least ¼ of a cycle of the network frequency later than the first vacuum switch, augmented with the minimum arcing time in the first vacuum switch, in order to prevent high over-voltages, caused by virtual chopping.

2 Claims, 3 Drawing Figures

METHOD FOR SWITCHING IN A THREE-PHASE HIGH VOLTAGE CIRCUIT

This is a continuation of application Ser. No. 239,050, filed Feb. 27, 1981, now abandoned.

BACKGROUND OF THE INVENTION

1. Field of the Invention

The invention relates to a method for interrupting power to an inductive load in a three-phase high voltage network by means of a vacuum switches having quick dielectric recovery characteristics.

2. Prior Art

It has been found that upon interruption of an inductive load in a three-phase high voltage network, sometimes high overvoltages occur on the load to be interrupted. Since these overvoltages may cause considerable damage to the network due to insulation breakdown and the like, several investigations have been made in order to discover the likely causes of these high overvoltages. From these investigations it has become apparent that these high overvoltages occur only when in the pertaining circuit at least one of a number of conditions is fulfilled, the most important ones of which are:

1. Switching should be performed by switches having a quick dielectric recovery; this condition being fulfilled by vacuum switches.
2. The requirement of a predetermined network constellation; this implying inter alia, the presence of a sufficient capacitance between the phases on both the source side and the load side of the switch.
3. The switching time should be such that upon separation of the contact members one pole of the switch is close to a zero current passage.

Upon interruption of a load under the above conditions, in the first phase interrupted at zero current passage an overvoltage will occur that may result in re-ignitions in this phase. Under the prevailing circumstances the current resulting from these re-ignitions and having a very high frequency will be entirely or partially superimposed on the network current in both the other phases, which although already being interrupted still carry current. When the resultant of the superimposed current and the network current in these phases becomes about zero both the other phases will also be interrupted. Since, however, at the re-ignition moment the network current in the first phase causing the re-ignitions is close to a zero current passage, the momentary current value in both the other phases is relatively high, this resulting in a so-called high current chopping. In the literature this chopping of the relatively high current is generally called "virtual chopping". In view of the fact that with this "virtual chopping" the di/dt-value is high, very high overvoltages may occur in the installation during "virtual chopping".

In a publication by M. Murano et al, "Three-phase Simultaneous Interruption in Interrupting Inductive Current Using Vacuum Switches", I.E.E.E. Transactions on Power Apparatus Systems, January/Feburary 1974, pages 272–280, concerning the phenomenon "virtual chopping" it has been proposed to include a resistance in series with a capacitance in parallel to the load between the phases and ground. This, however, entails the drawback that the resistance and capacitance values have to be adapted to the pertaining circuit and the load to be interrupted, this solution moreover being rather expensive in case of high currents.

Another method referred to in the above publication employs a non-linear resistance the high cost of which is likewise of disadvantage.

A further method employs surge suppressors in order to restrict the detrimental results of "virtual chopping". This method, however, also entails the drawback of relatively high expenses accompanied by the fact that the surge suppressors have to be installed as close as possible to the load.

The above mentioned methods have furthermore in common that they are only operative under those network conditions for which they have been designed. Upon a change in these conditions one shall therefore have to adapt the method to this change. Furthermore the abovementioned methods have in common that they have not been directed to the prevention of "virtual chopping" but only to a protection against the results thereof.

A better method will therefore be complete prevention of "virtual chopping". This may be achieved by the provision of not fulfilling one of the abovementioned three conditions for the occurrence of "virtual chopping".

If one wishes to profit by the specific advantages of a vacuum switch the first condition will is inherently met. For eliminating the second condition the conductors connected to both the source side and the load side of the switch have to be completely shielded with respect to each other. In practice, however, such appears to be a difficult and expensive task.

Finally the occurrence of condition three may be obviated by synchronizing the switching time with respect to the zero current passage in such a manner that the separation of the contact members does not happen close to zero current passage. However, such a technique incurs the use of complicated and expensive devices.

SUMMARY OF THE INVENTION

Now the object of the invention is to provide a switching method for preventing the phenomenon "virtual chopping" in a simple and consequently inexpensive manner irrespective of the network conditions. The invention therefore provides a switching method of the above mentioned type having the characteristic that upon circuit interruption two of the three vacuum switches in two phases of a three phase power supply network, and each vacuum switch having a quick dielectric recovery open at least $\frac{1}{3}$ of a cycle of the network frequency later than the opening of the first vacuum switch in a first phase of the power supply network augmented with the minimum arcing time of the vacuum switch in the first phase.

This switching method guaranties that under no circumstances can "virtual chopping" occur.

The invention furthermore provides a switch mechanism capable of preventing "virtual chopping". This switch mechanism is characterized by means whereby upon interruption, the opening of one vacuum switch is initiated earlier than both the other vacuum switch in such a manner that between the time on which the first vacuum switch is opened and the time on which both the other vacuum switch are opened an interval is provided corresponding to at least $\frac{1}{3}$ of a cycle of the network frequency.

BRIEF DESCRIPTION OF THE DRAWINGS

The invention will now be described in detail with reference to the explaining drawing.

DETAILED DESCRIPTION OF A PREFERRED EMBODIMENT

Figure 1:
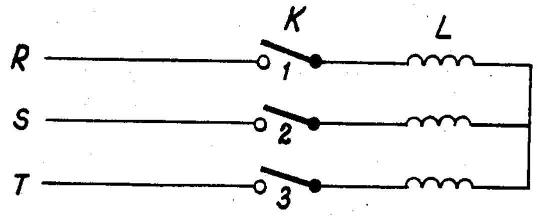
FIG. 1 represents a simplified switching diagram for elucidating the switching method according to the invention.

In FIG. 1 the switch and the load have been indicated by the reference letters K and L, respectively, the phases by R, S and T and the respective vacuum switches in each of the three phases by reference numerals 1, 2 and 3, respectively.

It is now assumed that the vacuum switch 1 of the phase R opens at an earlier time than the vacuum switch 2 and 3 of the phase S and T, that is to say with an interval $T_2$ equaling or surpassing $\frac{1}{3}$ of a cycle of the network frequency augmented by the minimum arcing time of the vacuum at a current conducive to "virtual chopping".

Figure 2:
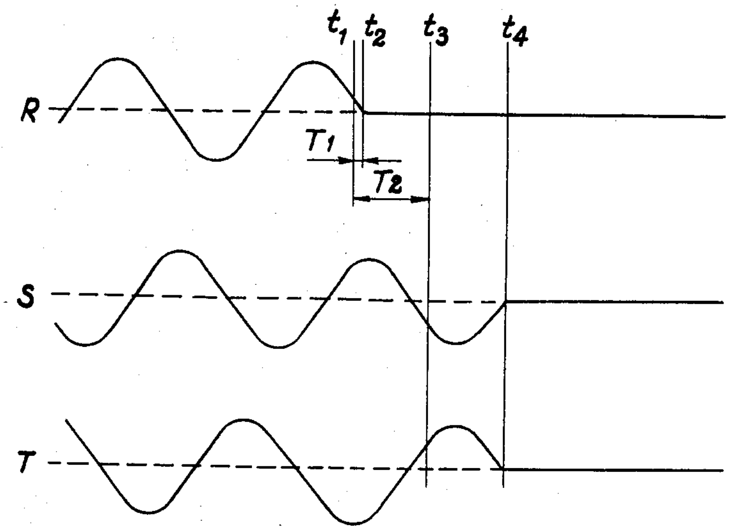
FIG. 2 represents an oscillogram of the situation in which upon opening of one vacuum switch the current in the pertaining phase is interrupted at the next zero current passages.

In FIG. 2 a border-line case has been disclosed in which "virtual chopping" might occur, that is to say the situation in which the opening time $t_1$ corresponding to the opening of the vacuum switch 1 has been selected such that between this point $t_1$ and the next zero current passage at time $t_2$ of the phase R the interval $T_1$ is provided, said interval equaling the minimum arcing time of the vacuums. Vacuum switches 2 and 3 of the phases S and T are opened at time $t_3$ between which points $t_3$ and $t_1$ the above-mentioned interval $T_2$ is provided.

Now two situations are conceivable, i.e.:

(a) The situation represented by FIG. 2 in which the current in the phase R is interrupted at the first zero current passage (at $t_2$) after opening vacuum switch 1, that is to say at point $t_1$.

Figure 3:
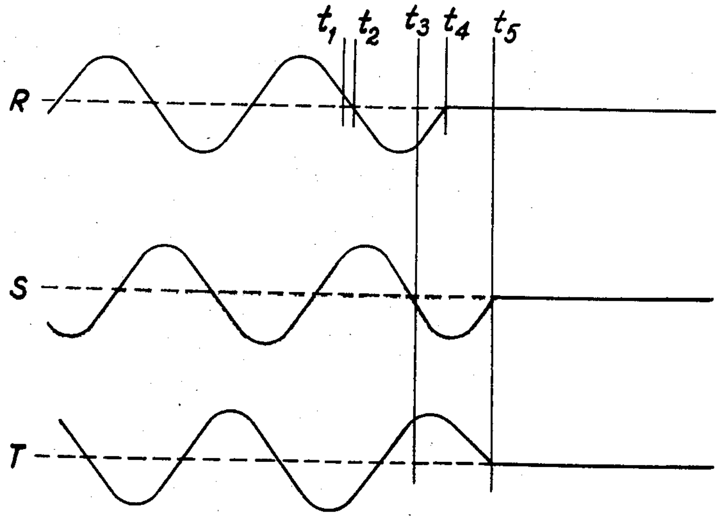
FIG. 3 represents an oscillogram of the situation in which upon opening of a vacuum switch the current in the pertaining phase is not interrupted at the next zero current passage.

(b) The situation represented by FIG. 3 in which the current in the phase R is not interrupted at the first zero current passage after opening vacuum switch 1.

In the situation (a) no "virtual chopping" can occur because at point $t_3$ the other vacuum switch 2 and 3 of the phases S and T, respectively, are still closed, this implying accordingly, no fulfillment of one of the conditions for the occurrence of "virtual chopping", i.e. the simultaneous three-phase switching. Upon opening of vacuum switch 2 and 3 at point $t_3$ the currents in these phases will be interrupted simultaneously in the known manner, that is to say at point $t_4$. Thus when the opening time $t_1$ of vacuum switch 1 is moved to an earlier point, i.e. when the interval between $t_1$ and $t_2$ extends beyond the interval $T_1$, the current in the phase R will be certainly interrupted at the point $t_2$, because the arcing time of vacuum switch 1 is longer than the minimum arcing time $T_1$ of the vacuum switch so that also in these situations "virtual chopping" appears to be impossible.

If, however, as shown for situation (b) the current in the phase R is not interrupted at point $t_2$ this current will only be interrupted at the next zero current passage, that is at the point $t_4$ as indicated in FIG. 3. The other vacuum switch 2 and 3 will then be opened at time $t_3$, such implying for vacuum switch 2 that the opening occurs just upon a zero current passage of the pertaining phase S. Consequently, the phases S and T will in the known way simultaneously only be interrupted at point $t_5$. If the interruption of the current in the phase R will occur at point $t_4$ as described above, there will be no "virtual chopping" because at that point the opening between the contact members of vacuum switch 1 has become sufficiently large to prevent re-ignition. Now when retarding the opening time $t_1$ of vacuum switch 1, i.e. the interval between $t_1$ and $t_4$ becoming smaller the vacuum switch R will always be interrupted at point $t_4$ until this interval does become so short that in face the condition represented by situation (a) occurs again. It is evident that in case of situation (a) in similar manner, upon setting point $t_1$ at an accuring earlier time situation (a) is transposed into situation (b). Where the situations (a) and (b) delimit the borders of the area conducive to "virtual chopping", it has been demonstrated above that the switching method according to the invention eliminates the "virtual chopping" phenomenon.

In summary, it may be remarked that in all the above-mentioned situations the current in the vacuum switch opened first is also interrupted first at a time at which either both the other switching paths are still closed or the vacuum switch opened first has already been opened so far that no "virtual chopping" is possible anymore. As a matter of fact of course the above described sitauations also apply when one of the two other vacuum switch is opened first, whereas the result of the switching method is also independent from the phase order of the three phase current network.

The switching method according to the invention is thus conducive to switching under various situations without the occurrence "virtual chopping" and without requiring special measures apart from the simple adaptation of the vacuum switch. In practice this switching method may be realized by modifying the switching mechanisms of the vacuum switch in such a manner that upon interruption one vacuum switch opens earlier at the above indicted time than both the other vacuum switch. It is self-evident that the switching-on may be performed in the normal way simultaneously for each of the three vacuum switch. A mechanism well suited for adaptation to the switching method according to the invention has been described in Dutch patent application No. 76.06848. The mechanism needs only modificaiton in such a manner that the cam disks controlling the switching-on and interruption actuate two switching paths simultaneously whereas the third switching path is separately actuated by a separate or displaced cam disk. The separate cam disk may have such a configuration that the pertaining switching path is interrupted by means thereof at the desired time before the interruption of the other two switching paths. The switching-on can remain unchanged.

It is evident that the switch according to the invention is not restricted to the aforesaid switch.

I claim:

1. A method for interrupting power to an inductive load supplied from a three-phase high voltage source to prevent virtual chopping and using a vacuum switch having quick dielectric recovery characteristics in each phase of the high voltage network, comprising the steps of:

opening the vacuum switch in a first phase at a given time; and opening at least one of the two remaining vacuum switches at a time subsequent to said given time equal to or greater than at least one-third of the period of the three-phase high voltage network frequency plus the minimum arcing time of the vacuum switch in the said first phase wherein the time of opening said at least one of the two remaining vacuum switches subsequent to said given time is less than one cycle of the power frequency.

2. A method as in claim 1 wherein said two remaining vacuum switches are opened simultaneously with one another.

* * * * *